United States Patent
Maayah et al.

(10) Patent No.: US 7,065,239 B2
(45) Date of Patent: Jun. 20, 2006

(54) AUTOMATED REPETITIVE ARRAY MICROSTRUCTURE DEFECT INSPECTION

(75) Inventors: Kais Jameel Maayah, Sunnyvale, CA (US); Harry Stanton Gallarda, Jr., Sunnyvale, CA (US); Lakshman Srinivasan, Cupertino, CA (US); Richard Barnard, Fremont, CA (US); Jun Liu, Pleasanton, CA (US)

(73) Assignee: Applied Materials, Inc., Santa Clara, CA (US)

( * ) Notice: Subject to any disclaimer, the term of this patent is extended or adjusted under 35 U.S.C. 154(b) by 622 days.

(21) Appl. No.: 09/682,850

(22) Filed: Oct. 24, 2001

(65) Prior Publication Data

US 2003/0076989 A1 Apr. 24, 2003

(51) Int. Cl.
*G06K 9/00* (2006.01)

(52) U.S. Cl. ............... 382/145; 382/149; 382/168; 356/237.4; 250/559.22

(58) Field of Classification Search ............... 382/141, 382/145, 149, 274, 168, 254, 232, 151, 286; 356/388, 394, 429, 237.2, 237.5, 237.4; 250/559.22, 250/559.45; 324/770; 257/184, E21.525, 257/E21.53
See application file for complete search history.

(56) References Cited

U.S. PATENT DOCUMENTS

| | | | | |
|---|---|---|---|---|
| 4,748,335 A | * | 5/1988 | Lindow et al. | 250/559.22 |
| 4,845,558 A | * | 7/1989 | Tsai et al. | 348/126 |
| 5,276,498 A | * | 1/1994 | Galbraith et al. | 356/237.2 |
| 6,360,005 B1 | * | 3/2002 | Aloni et al. | 382/148 |
| 6,376,854 B1 | * | 4/2002 | Shishido et al. | 250/559.45 |
| 6,388,747 B1 | * | 5/2002 | Nara et al. | 356/394 |
| 6,411,377 B1 | * | 6/2002 | Noguchi et al. | 356/237.4 |
| 6,614,923 B1 | * | 9/2003 | Shishido et al. | 382/149 |
| 6,674,890 B1 | * | 1/2004 | Maeda et al. | 382/149 |
| 6,759,655 B1 | * | 7/2004 | Nara et al. | 250/310 |

* cited by examiner

*Primary Examiner*—Sheela Chawan
(74) *Attorney, Agent, or Firm*—Tarek N. Fahmi

(57) ABSTRACT

A method and system for defect inspection of microfabricated structures such as semiconductor wafers, masks or reticles for micro-fabrication, flat panel displays, micro-electro-mechanical (MEMs) having repetitive array regions such as memories or pixels. In one embodiment a method of inspection of microfabricated structures includes the steps of acquiring contrast data or images from the microfabricated structures, analyzing automatically the contrast data or images to find repetitive regions of the contrast data and comparing the repetitive regions of the contrast data with reference data to detect defects in the microfabricated structures. In the analyzing step, a cell-metric such as the range, or mean or other statistical or mathematical measure of the contrast data is used to find the repetitive regions. Image or contrast data acquisition can be performed with an optical, e-beam or other microscope suited for microfabricated structures.

26 Claims, 14 Drawing Sheets

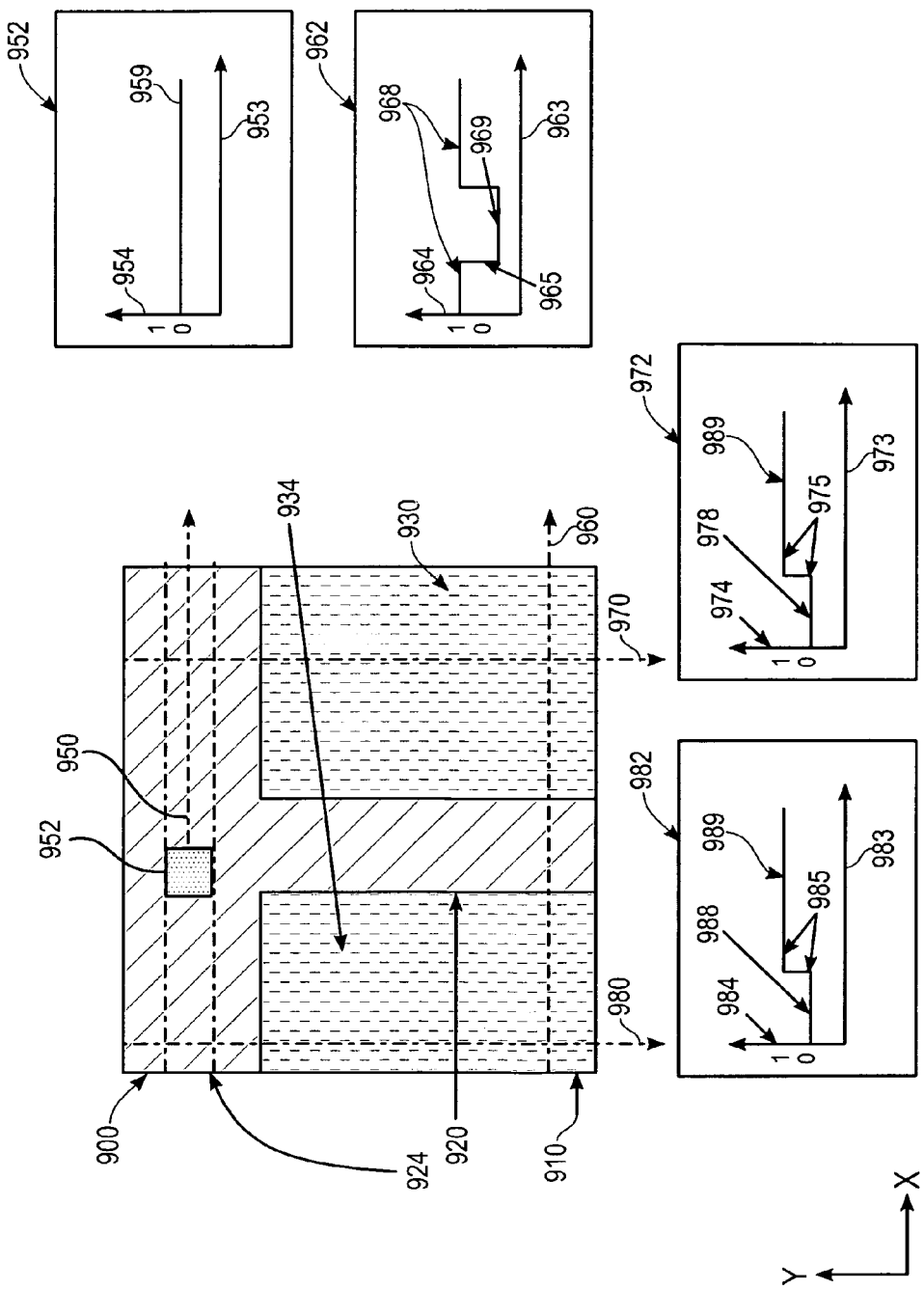

AUTOMATED REPETITIVE ARRAY MICROSTRUCTURE DEFECT INSPECTION

BACKGROUND OF INVENTION

1. Field of the Invention

This invention relates to methods and systems for use in defect inspection of microfabricated structures such as integrated circuit die on semiconductor wafers, masks or reticles for microfabrication, flat panel displays, micro-electromechanical (MEMs) devices and the like during and after manufacture. In particular, the invention provides methods and systems for more effectively and efficiently inspecting microfabricated structures that are repetitive in nature such as memory cells including SRAM, DRAM, FRAM, Flash memory, repetitive programmable logic ICs such as PLAs, PLDs, MEMs displays repetitive pixel structures and flat panel displays with repetitive pixel structures and the like.

2. Prior Art

Over the past decade, defect inspection to detect microscopic manufacturing defects has become a standard part of microfabrication manufacturing flows, especially for semiconductor wafers.

Various types of inspection technology are in use including bright-field optical inspection with, for example, a KLA-Tencor 2138 and 2139 made by KLA-Tencor of San Jose Calif., dark-field inspection with for example a KLA-Tencor AIT2 also made by KLA-Tencor. More recently e-beam inspection, with for example Odyssey 300 by Schlumberger Technologies Inc. of San Jose, Calif. or a KLA-Tencor eS20XP made by KLA-Tencor, is emerging as an important inspection technology especially for very advanced sub 0.25 um design rule manufacturing processes.

Each type of inspection technology is usually applied at steps in the semiconductor manufacturing flow where it is best suited to the types of defects most likely to be found. The economic benefits of inspection have been substantial and inspection is generally accepted as having made a significant contribution to the substantial increase in semiconductor wafer manufacturing yields seen in the 1990s.

Inspection systems are employed in a number of different applications including:

process monitoring to flag when a particular process step in the manufacturing flow has an increased defect density above the level normally expected at that step;

problem solving by inspecting so-called short-loop wafers that have only been processed with a subset of the manufacturing process steps in order to facilitate troubleshooting and diagnosis or optimization of a particular subset of process steps and during process development—to optimize a new manufacturing process to reduce or eliminate process-specific or systematic defect mechanisms.

Wafer inspection systems for patterned wafer inspection usually work as follows. A high powered microscope, traditionally an optical microscope, but more recently a SEM (Scanning Electron Microscope) or electron microscope, is set up under computer control to acquire sequentially images or contrast data of the area of the microfabricated structures or wafers to be inspected. To minimize the overhead of wafer stage movement and settling time during the inspection process, continuous scanning motion mechanical stages are used such as that described in U.S. Pat. No. 6,252,705 to Lo et al. These stages are specifically designed to have very smooth motion in at least one scanning axis to facilitate accurate image data acquisition without stage noise. In the case of an optically based inspection system, a TDI-CCD (Time Delay Integration-Charged Couple Device) image sensor is often used and synchronized with the scanning motion of the continuous scanning stage to acquire images rapidly. In the case of an e-beam inspection system, the scanning motion of the beam is synchronized with the scanning stage motion to acquire images rapidly.

The image or contrast data that is acquired in this manner is then compared to reference data. Defects are found or detected where there are differences between the reference and the acquired images. The reference images may be derived from CAD data as is often the case with mask or reticle inspection or may simply be images of neighboring cells or die on the wafer or similar wafer being inspected. The sensitivity of the defect inspection process to small defects can be controlled by adjusting the image acquisition parameters such as pixel size, contrast, brightness, charging and bias conditions etc., and image processing parameters that are used to compare the acquired inspection images and reference images.

When repetitive structures such as memory cells and the like are inspected, it is common practice to compare a memory cell with its neighboring cells or with a golden memory cell (often referred to as array or array mode inspection) as is described, for example in U.S. patent to Tsai et al. U.S. Pat. No. 4,845,558 "Method and Apparatus For Detecting Defect in Repeated Micro-miniature Patterns". Array mode inspection has advantages over random mode inspection due to the inherent similarity of neighboring cells in an array (random mode inspection is used for inspecting random logic or non-repetitive regions with reference data, for example, from other dice on the wafer). Neighboring cells often provide an excellent reference in array inspection as the cell reference itself will be very similar to the inspected cell and the cell image will include very similar imaging aberrations, artifacts or errors from what ever microscope is being used for inspection. Note that the image aberrations, artifacts and errors tend the cancel during the comparison process to find defects and are thus effectively eliminated. This results in increased sensitivity to defects in array mode inspection (versus random mode inspection). This advantage can alternatively be used to provide correspondingly higher throughput in array mode inspection as a result of being able to inspect with a larger pixel size at the same level of defect size sensitivity.

With Tsai et al's approach "the image is magnified to a scale so that features of the patterns repeated in the image occupy corresponding pixels or groups of pixels repeated in the array. Data is resolved from selected pixels and directly compared either to data obtained from corresponding pixels or from a database, whereby defective features are identified through well-known data comparison techniques."

However, this approach to inspecting array or repetitive areas and the approach used on commercial defect inspection systems available today have some important disadvantages, specifically:

the edges of the repetitive array area must be defined manually before inspection. This can be and often is an extremely time consuming and tedious process especially on advanced memory ICs where the actual area of truly 100% continuous accurately repetitive areas is rather limited. For example, real-world memory arrays are often comprised of large numbers of relatively small repetitive areas surrounded by non-repetitive and partially repetitive areas containing power supply distribution, decode logic and sense-amplifiers that often cannot be satisfactorily inspected with array inspection techniques. Each truly repetitive array segment must be identified manually before inspection.

adjoining non-repetitive segments must be inspected with a separate inspection algorithm for random areas requiring a time consuming second pass of the inspection tool effectively cutting actual tool throughput by 50% or more.

array edges are often not inspected as the accuracy of definition of the array boundaries is limited by inspection system overall position accuracy (stage errors, encoder errors, alignment errors and other error sources combined) and must include a buffer or exclusion zone at the edge of the array to ensure that false defect counts or false alarms are not generated when inadvertently inspecting non-repetitive regions surrounding the repetitive regions when for example accuracy limits are reached.

SUMMARY OF INVENTION

In view of the above problems, an object of the present invention is to provide a method and system apparatus for rapidly and thoroughly inspecting microfabricated structures with repetitive arrays while eliminating or minimizing the impact of the problems and limitations described.

A method for defect inspection of microfabricated structures having repetitive and non-repetitive regions, the method comprising determining a contrast threshold; acquiring contrast data from the microfabricated structures; thresholding the contrast data with the contrast threshold to create a mask of non-repetitive regions of the contrast data; masking the contrast data with the mask to create masked regions and unmasked regions of the contrast data and comparing the unmasked regions of the contrast data with reference data to detect defects in the repetitive regions of the microfabricated structures and to create defect data.

A method for detecting defects in microfabricated structures having repetitive and non-repetitive regions, the method comprising acquiring contrast data from the microfabricated structures; analyzing automatically the contrast data to find repetitive regions of the contrast data and comparing the repetitive regions of the contrast data with reference data to detect defects in the microfabricated structures.

A method for defect inspection of semiconductor wafers having repetitive and non-repetitive regions, the method comprising acquiring contrast data from the semiconductor wafer with an e-beam defect inspection system; analyzing the contrast data using a range of the contrast data to find repetitive regions of the contrast data; comparing the repetitive regions of the contrast data with reference data to detect defects in the semiconductor wafer and finding and reporting the location of the defects.

A defect inspection system for detecting defects in microfabricated structures having repetitive and non-repetitive regions, the system comprising an XY stage disposed to support the microfabricated structures for inspection; a microscope and detector to acquire contrast data of the microfabricated structures; an image computer equipped with stored program instructions for processing the contrast data to detect defects in the microfabricated structures, the processing comprising analyzing automatically the contrast data to find repetitive regions of the contrast data and comparing the repetitive regions with repetitive reference data to the detect defects in the microfabricated structures.

In accordance with other preferred embodiments, the invention includes displaying (in tabulated form or graphically) defect data (including defect location data, statistical data, classification data and defect density data), using optical (including bright field, optical dark field, optical gray field and laser scatter), charged particle beam, e-beam, voltage contrast, focused ion-beam, AFM, SXM, SFM and the like or UV microscopes with appropriate cameras and detectors to collect image and contrast data. Analyzing contrast data comprising using a range of cell metrics either individually or in combination. Cell-metrics including the range, mean, median, mode standard deviation, entropy and other higher order statistical functions of the contrast data to find repetitive regions of the contrast data, non-repetitive regions of the contrast data and the boundaries between repetitive regions and non-repetitive regions of the contrast data. Find the repetitive regions of the contrast data can also include sampling the contrast data, creating profiles of the contrast data, creating profiles a cell-metric of the contrast data.

Other objects, features and advantages of the present invention will become apparent to those of skill in art by reference to the figures, the description that follows and the claims.

BRIEF DESCRIPTION OF DRAWINGS

FIG. 9A is a diagram illustrating the dual profile contrast data or image sampling approach in accordance with a preferred embodiment of the present invention.

DETAILED DESCRIPTION

Figure 1A:
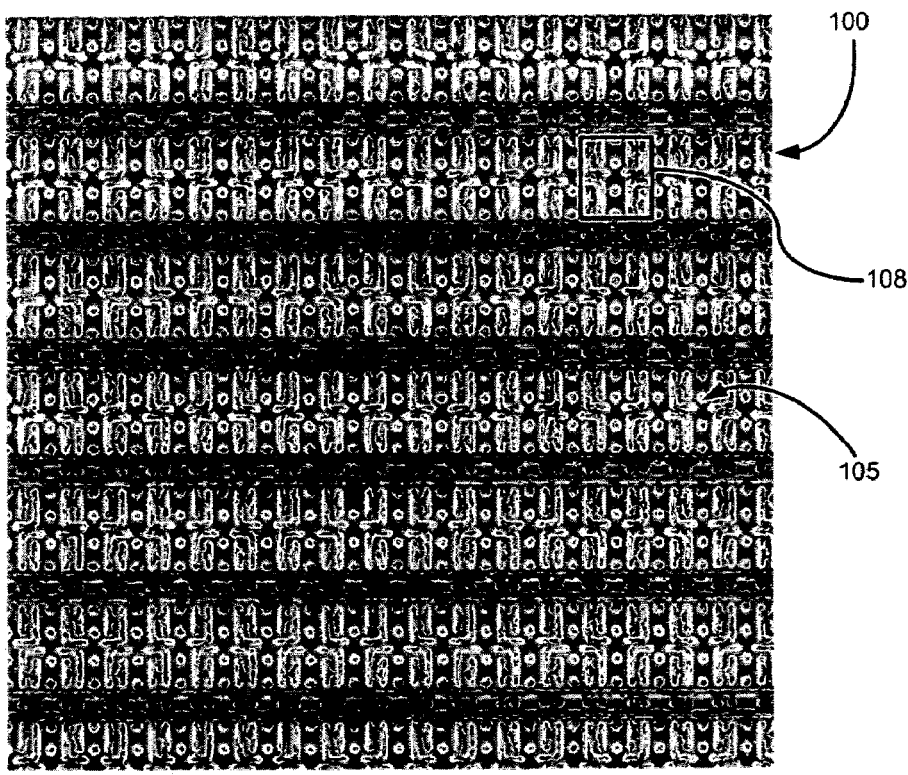
FIG. 1A illustrates a fully repetitive array structures.

In the following detailed description of the preferred embodiments and other embodiments of the invention, reference is made to the accompanying drawings. It is to be understood that those of skill in the art will readily see other embodiments and changes may be made without departing from the scope of the invention.

The following terms are defined below for clarification and are used to describe the drawings and embodiments of the invention:

Cell: A single cell repeated in a microfabricated structure such as for example, a DRAM or SRAM cell (or multiples there of) in a semiconductor wafer. This may include macro-cells comprised of multiple cells reflected and combined in groups of two, four or more cells together.

Cell size: The size of the repeating cell in the X direction or Y direction usually measured in microns or pixels and sometimes also reported as a spatial frequency, for example, as a number of cells per unit length.

Array (of cells): An area of continuously repeating cells in a regular matrix usually but not always in both X and Y directions.

Repetitive region: A portion of an image or microfabricated structure where an array of cells is repeated regularly.

Non-repetitive region: A portion of an image or microfabricated structure where features do not repeat regularly or in some cases where a different repetition period is present than that present in the array being inspected.

Cell-metric: A mathematical function that provides a relative measure of whether a particular cell or cells in question are present in a potential repetitive array region of an image. Preferably a good cell-metric will have a distinct value when measured over an array area, and a different value or values over any other structures.

Cell-metric-array: An array of numbers representing the value of the cell-metric mathematical function over an entire image or some sampled sub-set of an entire image or contrast data set being inspected.

Cell-metric-reference: A number or region of a cell-metric histogram that represents the mathematical mode, median or arithmetic mean or other numerical average of the value of the cell-metric mathematical function calculated for a range of different cell-sized windows in an image known to be comprised of all or mostly of a repeating array of cells.

Sliding-window: A selected segment of an image referred to as a window preferably the size of a cell and used to enumerate the cell-metric. Alignment of the sliding window with the cells is generally not required (it is preferable to select cell-metrics that do not require alignment with cells to minimize computation time). The sliding-window is moved mathematically to enumerate the cell-metric at various sample locations within the image being examined for repetitive and non-repetitive regions. Hence the term sliding window meaning moving the selected window continuously or in approximately uniform steps or other sampling steps to sample a subset of the image where the cell-metric is to be enumerated.

One-dimensional line profile: The result of enumerating the cell-metric with a sliding window over a preferably linear slice of an image to be examined for repetitive and non-repetitive regions.

FIG. 1A illustrates an image 100 with repetitive array 105 of cell 108 in an image taken with an e-beam inspection system (not shown) during inspection of a typical microfabricated structure, in this case a semiconductor wafer. Repetitive cell 108 is outlined.

Figure 1B:
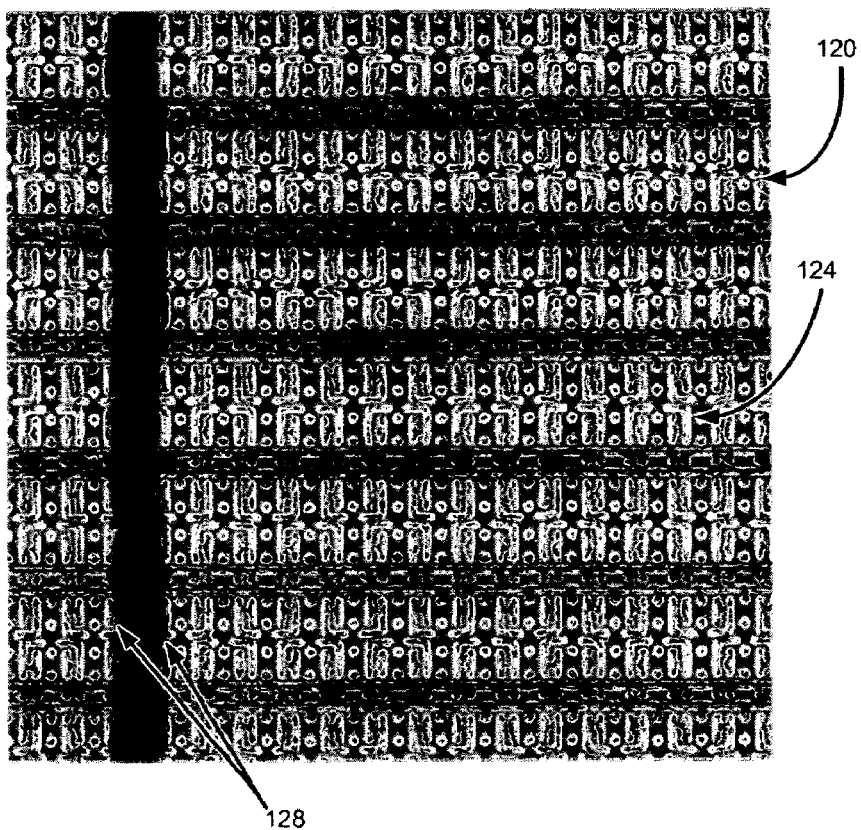
FIG. 1B illustrates a partially repetitive array structures on a microfabricated semiconductor wafer.

FIG. 1B illustrates an example image 120 that is partially repetitive with repetitive cell array region 124 and non-repetitive regions 128. This image was taken with an e-beam inspection system (not shown) during inspection of another typical semiconductor wafer. If image 120 is inspected with standard array-type inspection algorithms, non-repetitive section 128 will result in false alarms or false defects being reported unless it is masked in some manner in such a way that the repetitive inspection algorithm does not operate on non-repetitive sections 128 of the image. Conventional inspection systems provide this masking function for non-repetitive regions by allowing the system operator manually to outline truly repetitive regions of the microfabricated structure prior to inspection. This manual definition results in an exclusion zone (not shown) around the edge of the repetitive array regions due to inherent inspection system positioning errors. Defects in the exclusion zone at the edges of the array are not detected with this conventional inspection approach. It is highly desirable to develop inspection systems and methods that can detect defects at the edges of repetitive arrays while taking advantage of the inherently increased speed and sensitivity of array based inspection algorithms.

Figure 1C:
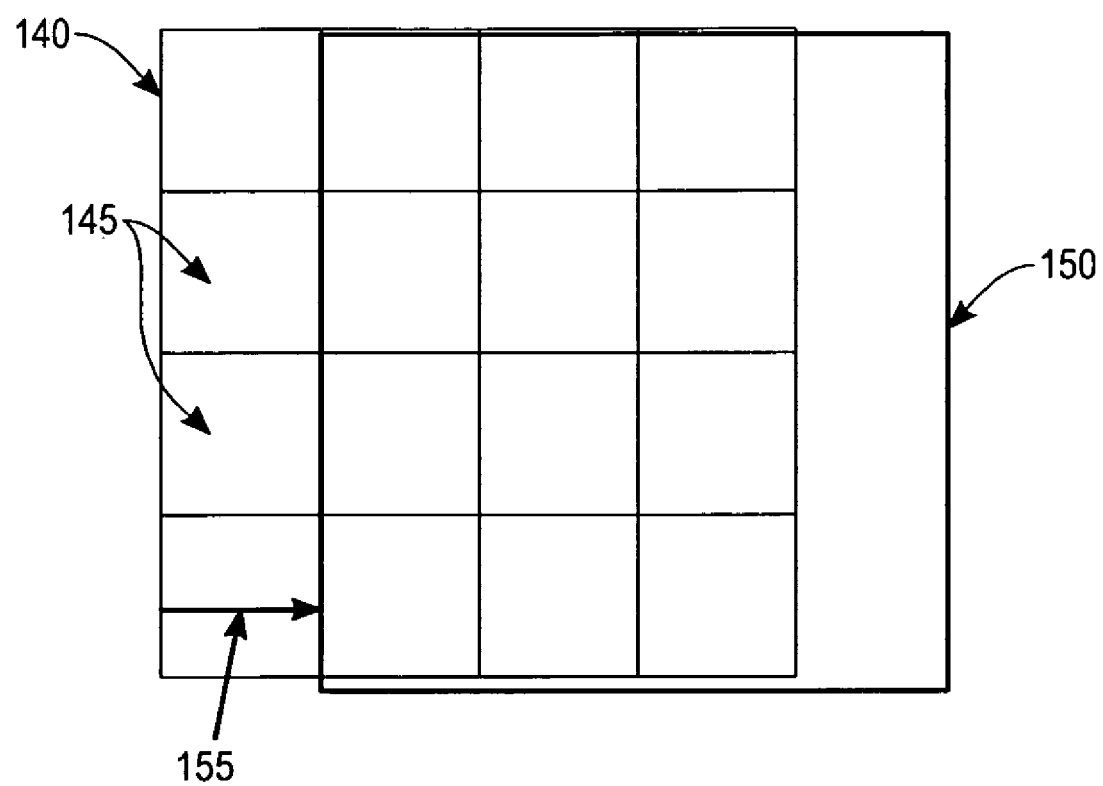
FIG. 1C depicts schematically prior art defect inspection of a repetitive array micro-fabricated structure using neighboring array cells as the reference for comparison to detect defects.

FIG. 1C is a schematic diagram of a repetitive array image 140 with repetitive cell examples 145. Second schematic image 150 is a copy of image 140, shifted precisely one cell size to the right or X direction. Vector 155 illustrations the direction and magnitude of the shift, in this example, a shift of a single cell parallel to the horizontal cell repeat direction. A prior art approach to array inspection algorithms is simply to shift the repetitive image by one cell in the X (as illustrated in FIG. 1C) or Y directions and then to subtract the shifted image from the original unshifted version of the image. This approach is often referred to as "shift-and-subtract".

Figure 1D:
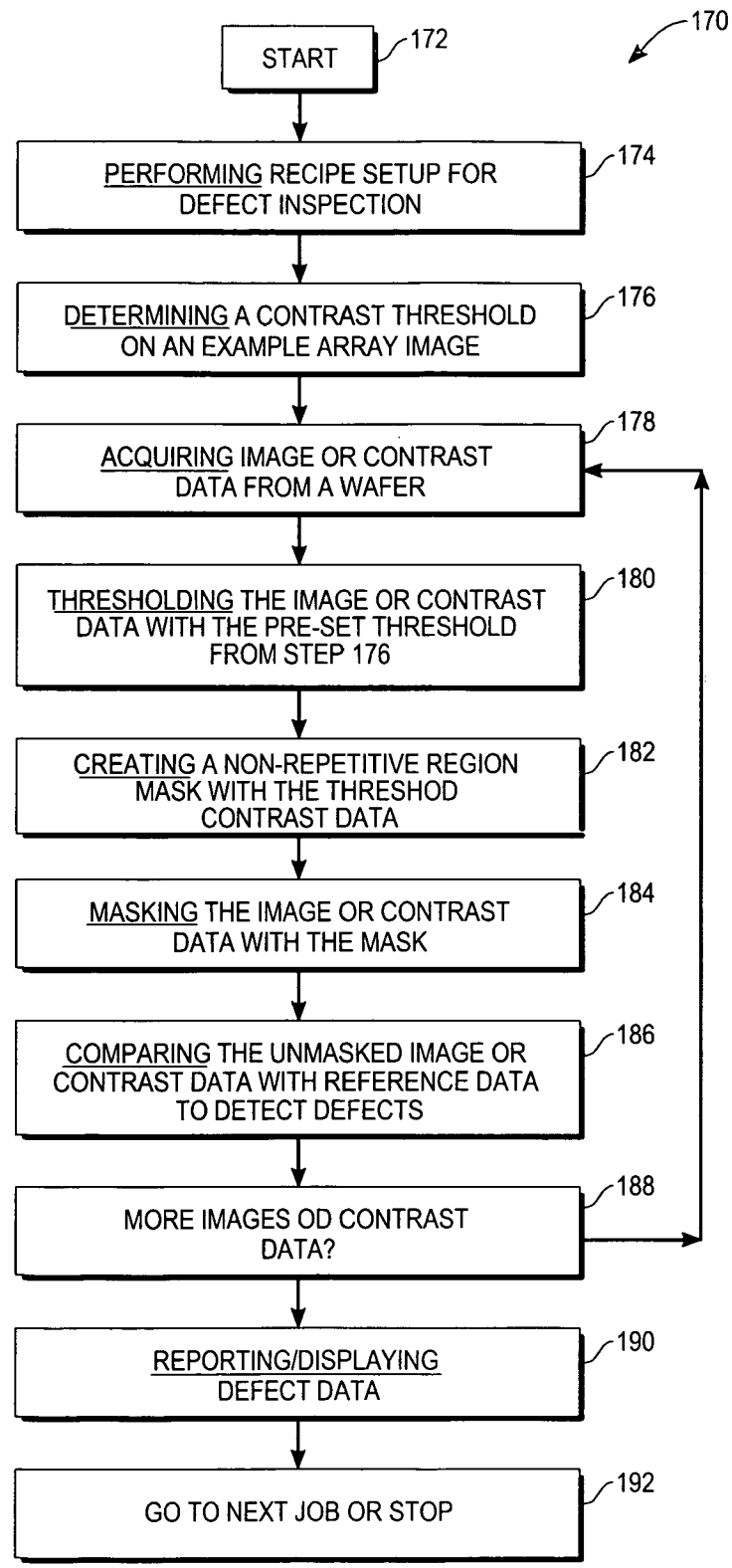
FIG. 1D is a flow diagram of a contrast thresholding method of inspection of repetitive semiconductor wafers according to one embodiment of the present invention.

FIG. 1D is a flow diagram of a method in accordance with embodiments of the present invention of inspecting some semiconductor wafers with repetitive and non-repetitive regions where there is a good contrast difference between the regions. The flow diagram starts at step 172. Step 174 is comprised of preparing to inspect a wafer or microfabricated structure by performing recipe setup for defect inspection. The inspection recipe contains the wafer-specific inspection system operating parameters such as region-of-interest to be inspected, the dice size, location and repeat period on the wafer, the pixel size, beam current, charging conditions and image acquisition conditions, defect detection algorithm and image processing parameters, etc. Step 176 is comprised of determining a contrast threshold on an example array inspection image. This will usually be performed by a system user after the inspection recipe including imaging conditions has been setup as in step 174.

Step 178 is comprised of acquiring image or contrast data of a wafer being inspected for defects. Step 180 is comprised of thresholding the image or contrast data with the pre-set threshold determined in step 176. The thresholding process can also be performed on averaged projected line profiles of the contrast data or images in the X and Y directions (i.e. each point is the line profile is calculated as the average of all the pixels in a particular row or column). This approach is computationally more efficient and is less sensitive to image noise or artifacts.

Step 182 is comprised of creating a non-repetitive region mask with the thresholded contrast data. Step 184 is comprised of masking the image or contrast data with the non-repetitive region mask. Step 186 is comprised of comparing the unmasked portion of the image or contrast data with reference data to detect defects in the wafer. It should be noted that it is important in the implementation of the comparison algorithm to ensure that masked contrast data at repetitive array edges not be used erroneously as reference data because this will of course result in unacceptably high false defect rates. Step 188 is comprised of determining whether there are more images (or contrast data) to be processed. When more processing is required, the flow diagrams repeats steps 178 to 188 until all the data or images are processed and the inspection job is complete.

Step 190 is comprised of reporting or displaying any defect data using defect location and any defect size or classification information available. At step 192 the process is either stopped or moves to the next inspection job. The mask created for the inspection can also optionally be reported.

A small percentage of semiconductor wafers exhibit contrast differences between repetitive and non-repetitive regions that are sufficient for the method of flow diagram 170 to work reasonably well. However, this method has limitations in that it does not handle robustly contrast and background illumination variations that are common artifacts particularly with some wafer types on e-beam inspection systems.

Figure 2:
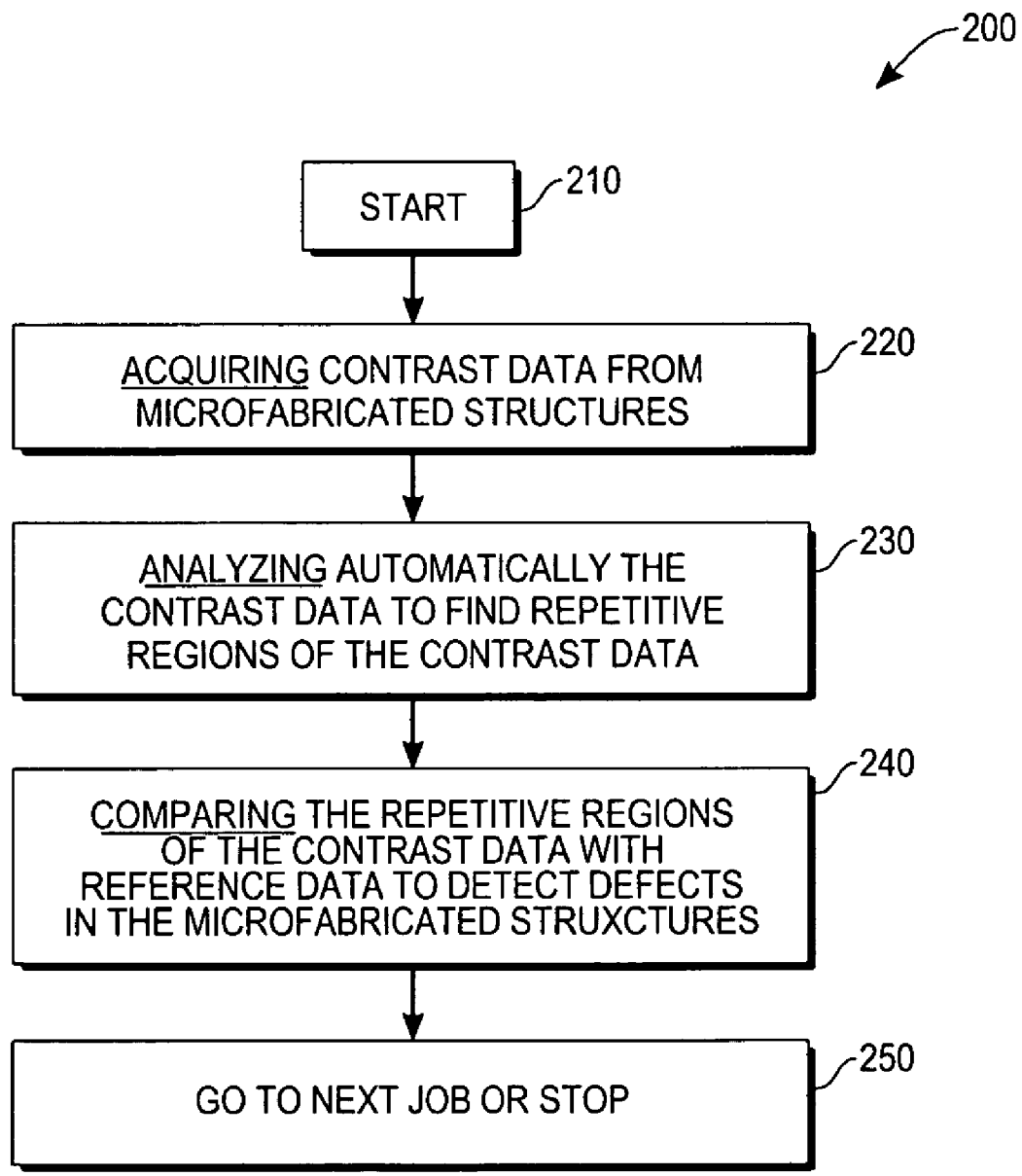
FIG. 2 is a flow diagram of an image analysis method of defect inspection of microfabricated structures according to a preferred embodiment of the invention.

FIG. 2 is a flow diagram 200 of a method according to the present invention of inspecting repetitive microfabricated structures that include non-repetitive or partially repetitive sections such as 128. The method starts at 210 which includes preparation and setup for inspection including operations such as loading the microfabricated structure, for example a semiconductor wafer, into the inspection system and then writing an inspection recipe or recalling an existing recipe which contains inspection system parameter settings for the particular structure type to be inspected.

Step 220 comprises acquiring contrast data from the microfabricated structures. As is known by those of skill in the art, different inspection systems will do this in slightly differing manners, however, the result is a collection of data, often in digital form, often arranged as images acquired with a combination of microscope, detector or camera and an analog-to-digital converter. The microscope imaging conditions will be setup in accordance with any recipe selected or defined in step 210.

While not required, it is preferable to select or adjust the magnification of the microscope being used for inspection of repetitive structures so that a whole integer number of pixels corresponds reasonably accurately with the size of a single repetitive cell. In this instance, reasonably accurately will usually mean to within ~10–20% of a pixel size of error across a single repetitive cell. The goal of magnification calibration in this manner is to minimize or eliminate aliasing or differences caused by pixels in neighboring cells being differently aligned with respect to the features within the cells. This condition is achieved when an integer number of pixels fits precisely across a single cell. When the pixels in neighboring cells are aligned accurately in this manner, the inspection results are more sensitive to subtle and smaller defects than if aliasing noise (caused by the pixel alignment from cell to cell being different) is present. This is particularly true when neighboring cells are used as references with repetitive region inspection algorithms such as shift-and-subtract and the like. Note that the increased sensitivity of array-type inspection algorithms can also be translated into faster inspection with a larger pixel size being acceptable for a given level of defect sensitivity.

Step 230 comprises analyzing the contrast data to find repetitive regions of the contrast data. The analysis of the contrast data can be performed in an analog or digital form and can be accomplished in hardware or in software using stored program instructions. More details of the range of methods and algorithms that can be used to find the repetitive regions follow. The basis for many of these algorithms is measuring a parameter or cell-metric of the repetitive region that is different from the value of that parameter in the non-repetitive regions. Note that "different" in this context means different to a degree that is sufficient to provide robust and reliable detection of the differences between repetitive and non-repetitive regions on a wide range of contrast data or images (this difference must also be sufficient to locate the boundaries between repetitive and non-repetitive regions). Several algorithms can be employed that can be made to work on a small set of images with particular characteristics (discussed below), however, achieving an algorithm that provides both:

robust and reliable performance over a wide range of real-world images and microfabricated structures, and that is sufficiently computationally fast and speed-efficient to be commercially viable and to not result in slowing unacceptably the overall throughput of the inspection system, has proven to be extremely difficult and challenging even to the inventors. Alternative approaches to improving the overall computational efficiency of the method can also be employed including using prior knowledge of the location of repetitive and non-repetitive regions from previous inspection runs on similar wafers and use of CAD databases.

Step 240 comprises comparing the repetitive regions of the contrast data with reference data to detect defects in the microfabricated structures, for example semiconductor wafers, being inspected. Having located the truly repetitive regions of the microfabricated structures, a number of approaches to defect detection can be employed. Most take advantage of the repetitive nature of the structures and use neighboring repetitive cells as references. One approach to this described previously, is the shift-and-subtract algorithm. In many practical inspections, however, two references are required for comparison purposes to uniquely identify the correct repetitive cell with the defect. The first comparison against a neighboring cell detects the presence of a defect in one or other of the two cells. The second comparison with a second reference or second neighboring cell allows identification of the cell that really has the defect (this is often referred to as arbitration with the second reference called an arbitrator). This assumes that there is only a single defect between the three cells being compared. Two or more of the cells being compared being defective in this manner does of course happen from time-to-time but is generally an unlikely and infrequent event that does not significantly impact the overall error-rate for the inspection system or process.

At step 250, the process either stops or moves to the next inspection job on this or another microfabricated structure. At this point in the process, data will often be displayed, archived to a database on the system or on a remote networked host computer (not shown in the flow diagram). Defects found during this process are often reviewed and classified either manually or automatically on either the inspection system or a dedicated defect review system such as the SEMVision defect review SEM from Applied Materials of Santa Clara, Calif.

Figure 3:
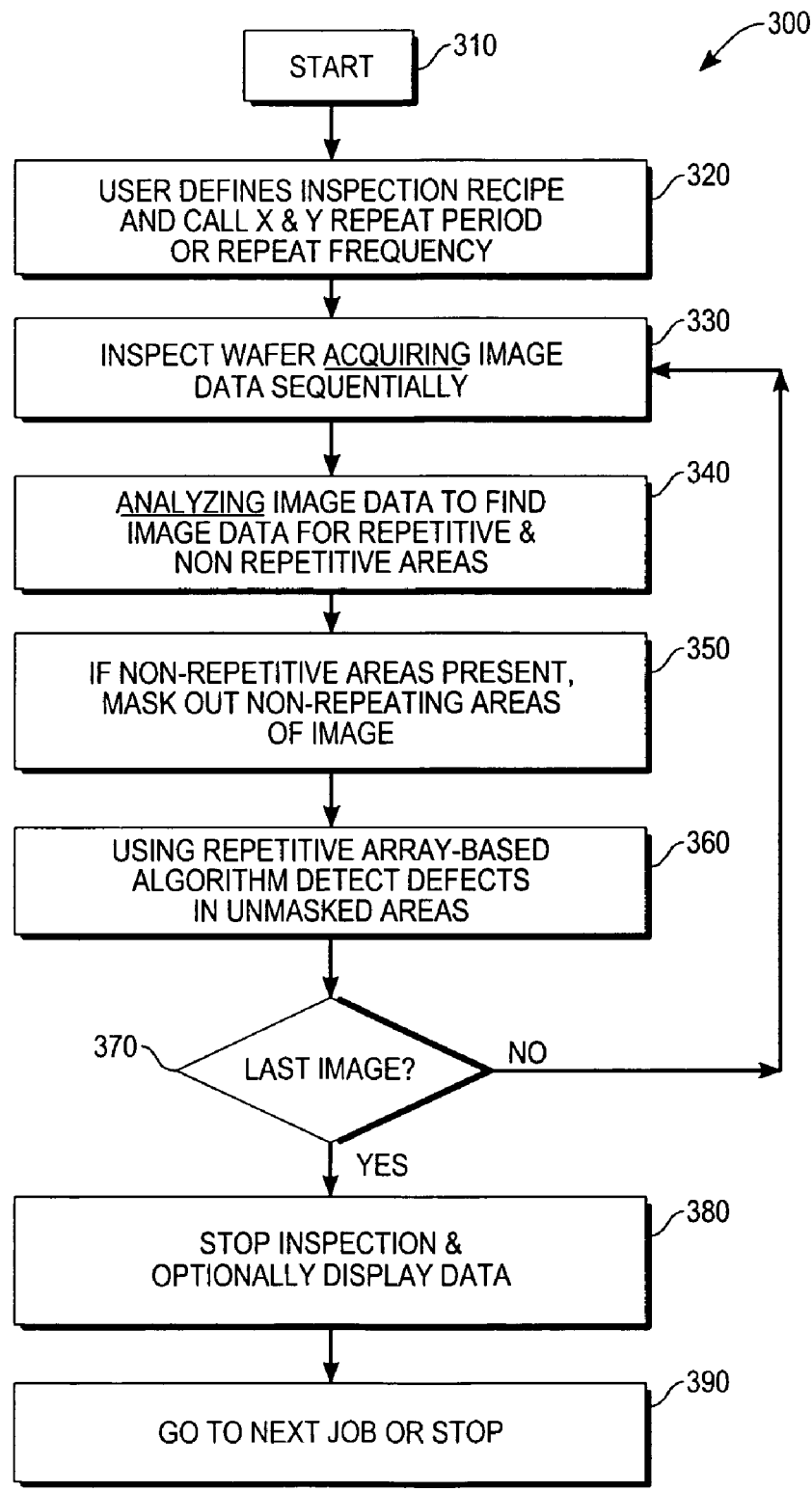
FIG. 3 is a detailed flow diagram of a preferred embodiment of the invention.

FIG. 3 is a flow diagram 300 of a preferred embodiment of the present invention. Step 310 is the start of the flow diagram process and will typically include preparation for inspection and loading the wafer into the inspection system.

During step 320, the user defines the inspection recipe that contains all the system operating parameters required to accomplish the inspection. In addition the user defines, measures or provides the cell repeat period or repeat distance in both the X and Y directions. Alternatively the cell repeat spatial frequency in the X and Y directions can be determined and entered. In many respects the repeat period and repeat spatial frequency contain effectively the same information, one simply being the mathematical reciprocal of the other.

Step 330 comprises inspection by acquiring images or contrast data of the microfabricated structures on the wafer sequentially. Different inspection systems will do this in slightly differing manners, however, the result is a collection of data, often in digital form often arranged as images acquired with a combination of microscope, detector or camera and an analog-to-digital converter. The microscope imaging conditions will be setup in accordance with the recipe defined in earlier steps.

Step 340 is comprised of analyzing the contrast or image data to find regions corresponding to repetitive and or non-repetitive areas of the wafer or microfabricated structures. As is shown in FIG. 4, a range of possible likely combinations of repetitive and non-repetitive regions exist on real-world structures, ranging from completely repetitive regions, often in the majority, to completely non-repetitive images. In particular the boundaries between the repetitive and non-repetitive regions are identified at step 340. A range of possible algorithms for detecting repetitive and non-repetitive regions can be used in accordance with the invention and will be discussed in detail herein.

At step 350, if non-repetitive regions have been detected or found during step 340, the non-repeating regions of the image are masked out by using a mask constructed from the location of the repetitive regions and the boundaries between the non-repetitive and repetitive regions of the image.

At step 360, repetitive array-based algorithms such as for example, shift-and-subtract or similar, are used to detect defects in the unmasked areas of the image or contrast data.

At step 370, the process checks to see if the present image or data being processed is the last. If more images or data are still to be processed the flow diagram directs the process back to step 330 and repeats the sequence until no more images are available or the inspection process is complete. When the last image is processed, the flow diagram directs the process to step 380.

At step 380, the inspection process is stopped and optionally the defect data is displayed, archived, transferred to a database or host computer as desired.

At step 390 the process either stops or moves to the next inspection job on this or another microfabricated structure.

FIGS. 4A–F are schematic diagrams of images with repetitive array areas and adjacent non-repetitive areas of a typical repetitive memory array on a semiconductor wafer. For reasons of illustration, the non-repetitive regions are shown as clear white areas although this level of contrast difference between repetitive and non-repetitive regions is rare in real-world wafers.

Figure 4A:
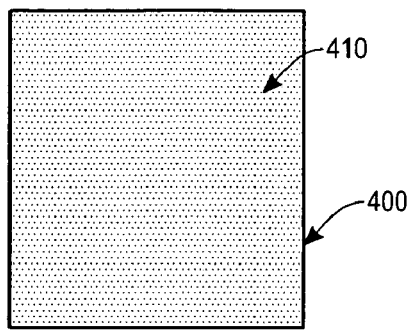
FIG. 4A–F are schematic defect inspection images or contrast data from microfabricated semiconductor wafers illustrating situations where repetitive array structures and non-repetitive structures appear in the same inspection images.

FIG. 4A is schematic image 400 with repetitive region 410. Image 400 is an example of a completely repetitive image.

Figure 4B:
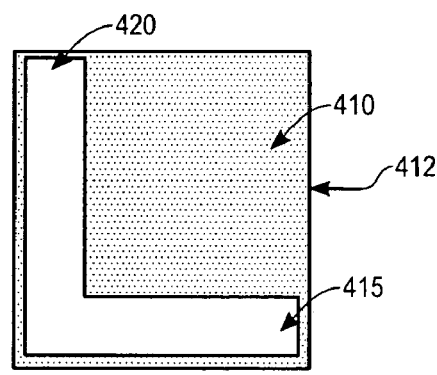

FIG. 4B is schematic image 412 with repetitive region 410 and non-repetitive regions 415 and 420.

Figure 4C:
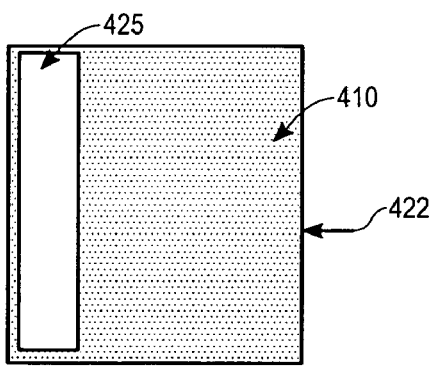

FIG. 4C is schematic image 422 with repetitive region 410 and non-repetitive region 425.

Figure 4D:
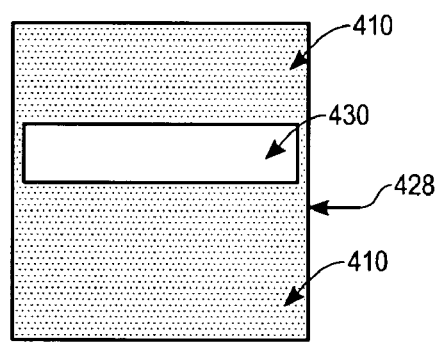

FIG. 4D is schematic image 428 with repetitive region 410 and non-repetitive region 430.

Figure 4E:
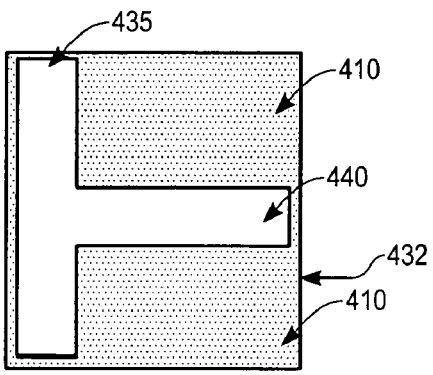

FIG. 4E is schematic image 432 with repetitive region 410 and non-repetitive regions 435 and 440.

Figure 4F:
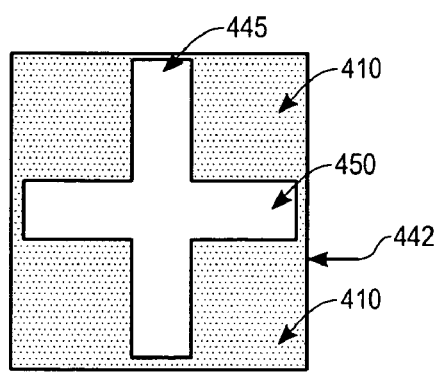

FIG. 4F is schematic image 442 with repetitive region 410 and non-repetitive regions 445 and 450.

It should be noted that in all these schematic example images in FIG. 4, the non-repetitive regions span the whole image from one edge to the opposite edge of the image. This spanning of non-repetitive regions is representative of inspection of real-world semiconductor wafers. This observation provides the opportunity for significant simplification and efficiency gains in the algorithm used to detect and locate repetitive and non-repetitive regions during real-time inspection.

Figure 5:
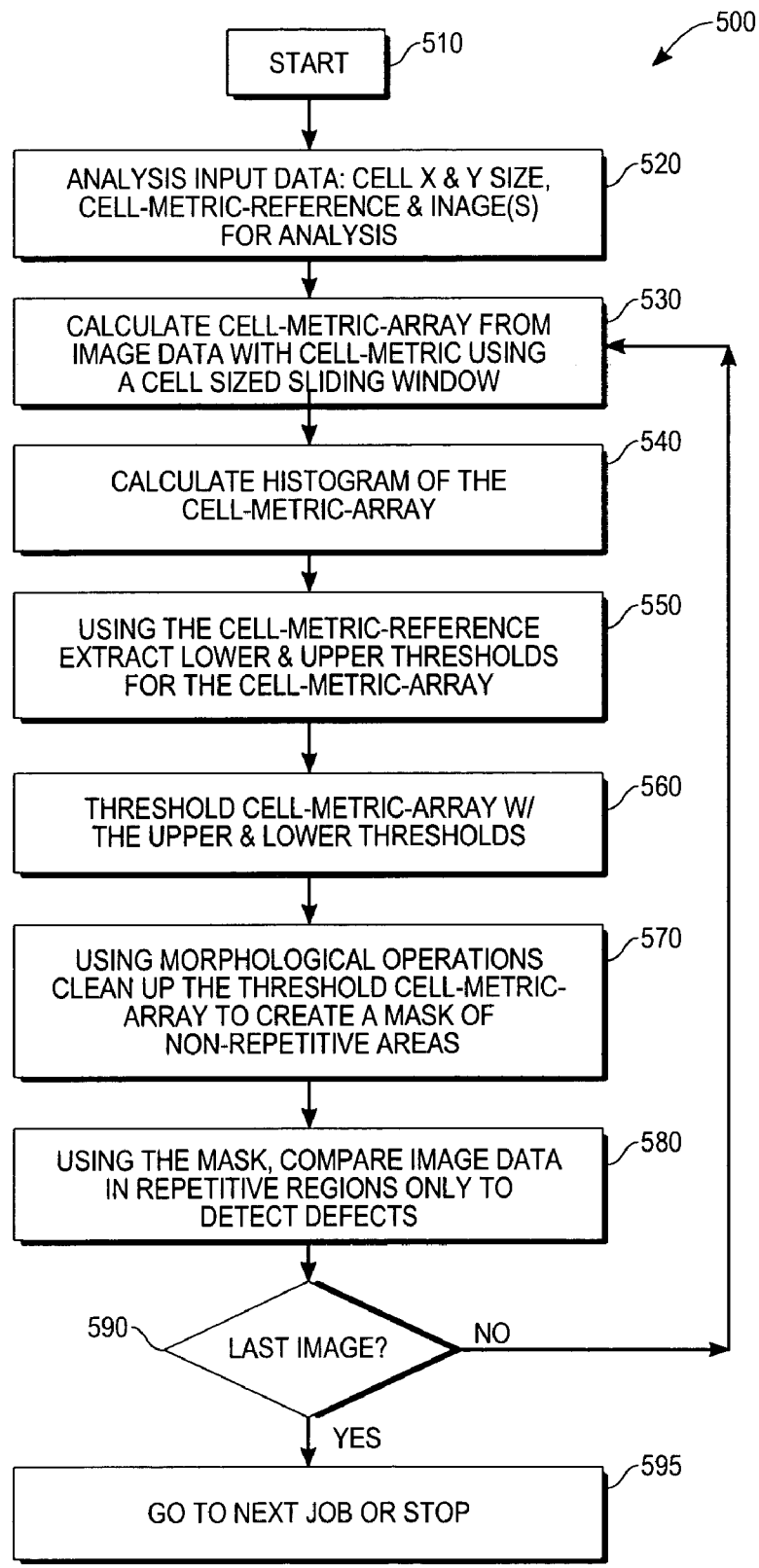
FIG. 5 is a flow diagram of a preferred embodiment of the invention illustrating in more detail the image-analyzing step.

FIG. 5 is a flow diagram 500 of a method of image analysis to find repetitive regions, non-repetitive regions and the boundaries between them in microfabricated structures such as semiconductor wafers according to a preferred embodiment of the present invention. This method can be used in step 230 of FIG. 2 and in step 340 of FIG. 3. FIG. 6A–F illustrates diagrammatically the data operations described by flow diagram 500. For reasons of illustration, FIG. 6 is described in parallel with FIG. 5.

The image analysis process starts at FIG. 5, step 510. At step 520 analysis input data comprising cell X and Y size, repeat period, or repeat spatial frequency, the cell-metric-reference and an image or images are provided for analysis. The cell-metric-reference is the value of a cell-metric (a mathematical function that facilitates the detection of repetitive and non-repetitive cell array regions) when used to operate mathematically on an image of an array of the target cells. Calculation of the cell-metric-reference is described in FIG. 7. Selection of the cell-metric mathematical function is discussed below.

At step 530 a cell-metric-array is calculated from the image data using the cell-metric optionally together with a cell-sized sliding-window. The cell-metric or cell-metric mathematical function is preferably calculated over an area of the image that is the size of the cell that was input or determined at the beginning of the process. In some embodiments of the invention, the cell-metric is preferably calculated in a cell-sized window over the whole image. In other preferred embodiments, the image is sampled, for example with line segments where the cell-metric is calculated within a cell-sized sliding window that is moved incrementally across a section of the image. Selection of the appropriate sample of image to be covered by the cell-metric is described below. For the purposes of description and illustration, it will be assumed that the cell-metric-array is a linear slice through the image. This approach also has efficiency and reliability advantages for real-world application to semiconductor wafers, however, those of skill in the art will recognize that other sampling approaches will be advantageous.

Figure 6A:
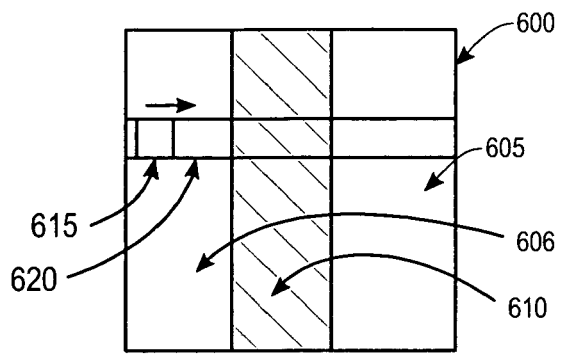
FIG. 6A–F are schematic diagrams representing examples of the data development during the image-analyzing step.
Figure 6B:

FIG. 6A shows partially repetitive schematic image 600 with repetitive regions 605 and 606, and non-repetitive region 610 that spans the whole image vertically. Cell-sized window 615 is used to calculate the cell-metric over a linear slice 620 through the image and illustrates the calculation of a cell-metric-array described in FIG. 5 step 530. The resulting linear cell-metric-array or cell-metric profile is illustrated in FIG. 6B. The horizontal axis 630 is the linear distance across the image typically in microns and the vertical axis 635 is the cell-metric value. Graph line 640 illustrates the value of the cell-metric at each point along the image slice 620.

Figure 6C:
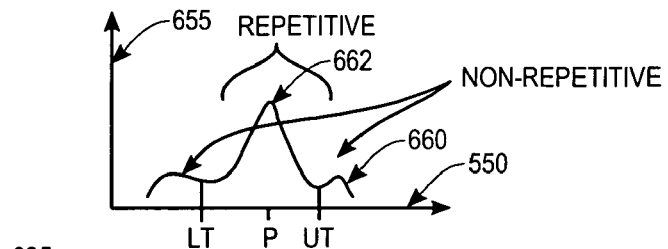

FIG. 5 step 540 is comprised of calculating a histogram (or frequency distribution) of the cell-metric-array. FIG. 6C illustrates the cell-metric-array histogram. Horizontal axis 650 represents the value of the cell-metric-array and vertical axis 655 is the relative number of points in the cell-metric-array at each value of along horizontal axis 650. Graph line 660 is the cell-metric-array histogram. The peak 662, in the cell-metric-array histogram, shows the cell-metric-reference value also identified on the horizontal axis 650 as "P". The section of the histogram around peak 662 represents values of the cell-metric that correspond to the repetitive sections of image 600 and their corresponding value in the cell-metric-array 640. Points "LT" (Lower Threshold) and "UT" (Upper Threshold) on either side of peak 662 depict the limits of the cell-metric-array 640 values that correspond with repetitive sections of the image. To the left of "LT" and to the right of "UT" represent value ranges of the cell-metric that correspond to non-repetitive regions or partially repetitive regions of the image. The UT and LT threshold locations on the histogram can be determined by taking the first minimum in the cell-metric-array on either side of the "P" 662. It may be desirable to smooth with a simple low-pass filter the cell-metric-histogram to remove false or erroneous maxima and minima. Alternatively "LT" and "UT" can be determined by any threshold selection technique such as those described in image processing publications and text books, for example, chapter 18, section 18.3 "Image Segmentation By Thresholding" of the book "Digital Image Processing" by Kenneth R. Castleman, published by Prentice Hall of New Jersey in 1996 and the Journal Computer Graphics and Image Processing, volume 7, 1978, pages 259–265 "A Survey of Threshold Selection Techniques" by Joan S. Weszka.

Figure 6D:
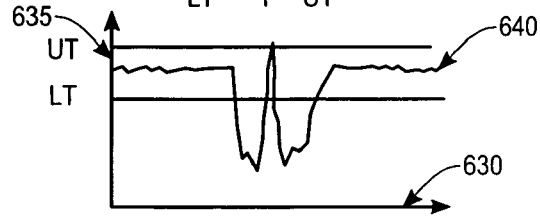
Figure 6E:
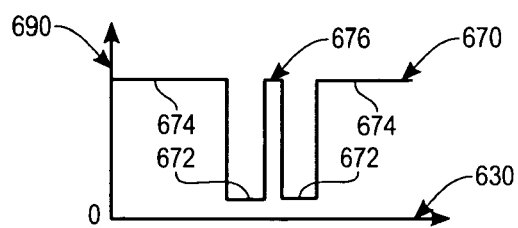

FIG. 5 step 560 comprises thresholding the cell-metric-array with the upper and lower thresholds, LT and UT. FIG. 6D depicts the "UT" (Upper Threshold) and "LT" (Lower Threshold) superimposed on the cell-metric array graph 640. FIG. 6E depicts the resulting thresholded cell-metric-array. Horizontal axis 630 is linear distance across the image. Vertical axis 690 designates repetitive sections of the image slice 620 equal to a value of the thresholded cell-metric-array of "1" and non-repetitive sections of the image slice 620 equal to a value of "0". Graph line 670 illustrates the value of the thresholded cell-metric-array as a function of linear distance across the image slice 620. Graph line segments 672 are non-repetitive regions of the image slice 620 and graph line segments 674 are repetitive sections of the image slice 620.

Erroneous graph line segment 676 represents a slight error in the value of the thresholded cell-metric-array suggesting incorrectly that there is a repetitive area in the middle of the non-repetitive section (the inverse error can also occasionally occur with erroneous non-repetitive sections in a repetitive region). While these errors are rare with a good cell-metric mathematical function, they do occur from time-to-time and need to be eliminated to avoid unnecessary and sometimes unacceptable false defect reporting. As these types of errors are almost always smaller than a single cell size (and based on experience are virtually never larger than the smallest expected non-array region), they can be readily filtered out with size-based morphological operations (well known to those of skill in the art and described in image processing text books for example Chapter 18, sections 18.7.1 and 18.7.2 of "Digital Image Processing" by Kenneth R. Castleman and published by Prentice Hall, Inc. of New Jersey in 1996). That is any feature or segment of the thresholded cell-metric-array that is smaller than a single cell is removed.

FIG. 5 step 570 is comprised of using morphological operations to cleanup the thresholded cell-metric-array 670 to eliminate erroneous graph line segments like 676. Examples of such morphological operations include erosion and dilation functions that eliminate features smaller than a given size, in this case the cell size.

To remove these small errors in the repetitive regions an erosion operation is followed by a dilation operation and to remove small errors in the non-repetitive regions a dilation operation is followed by an erosion. Both operations are generally necessary to eliminate errors in both repetitive and non-repetitive regions. The size of the erosion and dilation operations can be set to the size of a single cell or can be set to remove any feature smaller than the smallest repetitive or non-repetitive region. Alternatively the size of the erosion and dilation operations can be set by the user.

Figure 6F:
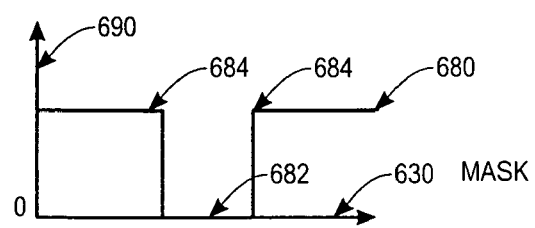

FIG. 6F illustrates the cleaned up thresholded cell-metric-array that is now ready to be used as an accurate mask to mask out, in this example, non-repetitive sections of the image. Horizontal axis 630 is linear distance across the image and vertical axis 690 designates repetitive sections of the image slice 620 equal to a value of the threshold cell-metric-array of "1" and non-repetitive sections of the image slice 620 equal to a value of "0". Graph line 680 illustrates the value of the thresholded cell-metric-array as a function of linear distance across the image slice 620. Graph line segment 682 is the non-repetitive region of the image slice 620 and graph line segments 684 are repetitive sections of the image slice 620. Although graph line 680 is only a one-dimensional map of the repetitive and non-repetitive elements of image slice 620, because of the common property that virtually all non-repetitive regions span across a complete image, graph line 680 can be used to mask accurately the complete image 600 for purposes of defect detection (without contributing significantly to the false defect rate).

FIG. 5 step 570 completes the image analysis method as referenced in FIG. 2 and FIG. 3. FIG. 5 step 580 represents the completion of the defect detection using the non-repetitive area mask generated by the image analysis. FIG. 5 step 590 repeats the image analysis process by directing the process back to step 530 until the last image has been completed and FIG. 5 step 595 looks for another inspection job or stops the inspections process.

Figure 7:
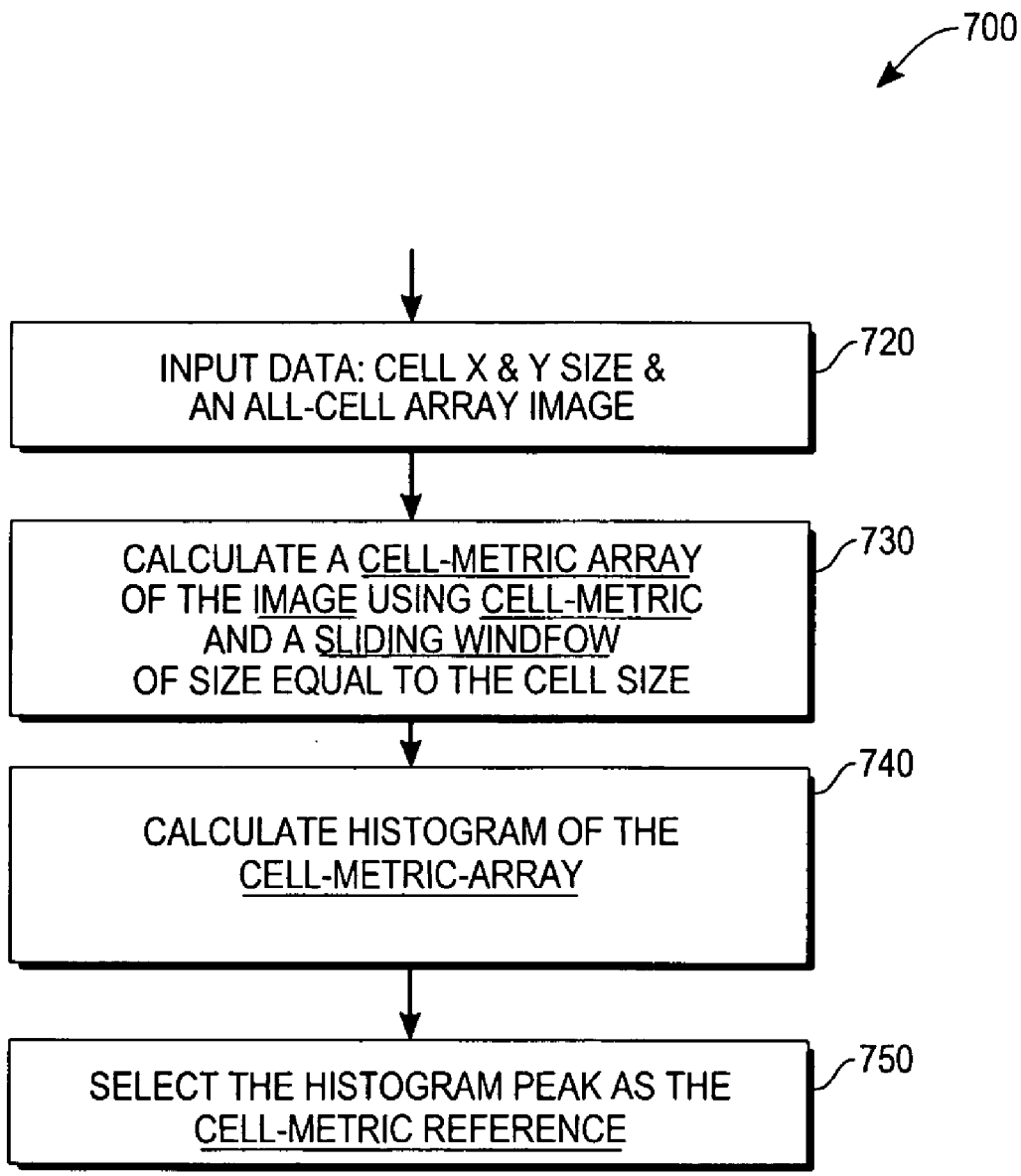
FIG. 7 is a flow diagram of the method of calculating a repetitive cell-metric-reference in accordance with a preferred embodiment of the present invention.
Figure 8A:
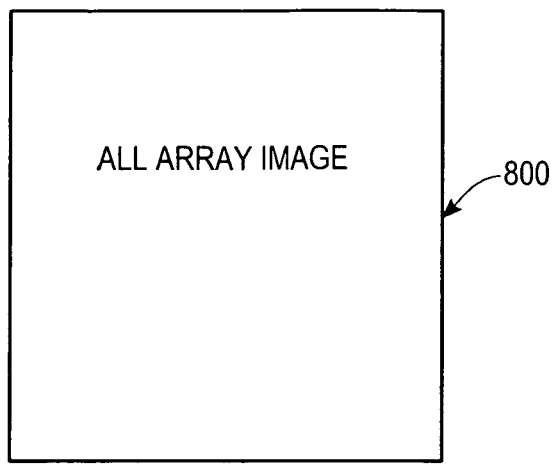
FIG. 8A–C is a schematic diagram representing examples of the data development during the method of calculating a cell-metric-reference in accordance with a preferred embodiment of the present invention.
Figure 8B:
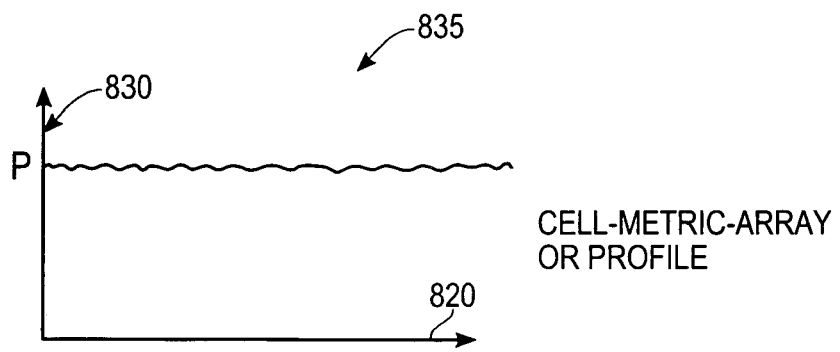
Figure 8C:
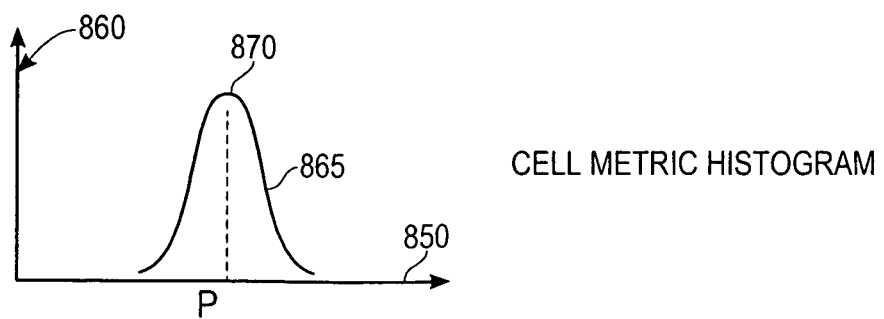

FIG. 7 is a flow diagram 700 of a method of calculating the cell-metric-reference. FIG. 8A–C illustrates the cell-metric-reference calculation data development during the process of flow diagram 700 and is described in parallel with FIG. 7 for reasons of clear illustration.

Flow diagram 700 starts at step 720 that collects input data comprised of the cell X and Y size and an image known to contain preferably only the repetitive cell with no non-repetitive regions. One approach to providing such an image is during the setup of the recipe for an inspection run, the system operator is asked to identify such an area. Other approaches to calculating the cell-metric-reference may of course be included such as calculating the cell-metric for single cell identified by the user or automatically, or by calculating the cell-metric from a simulated single cell from the circuit layout CAD information. The primary goal is to collect data showing the behavior of the cell-metric when calculated over a cell-sized window with a range of different alignments with respect to the actual cell. FIG. 8A schematic image 800 is illustrative of the all cell array image.

FIG. 7, step 730 comprises calculating the cell-metric over a cell-sized window for all or at least a portion of the image 800. The resulting values are collected in a cell-metric-array. The computational efficiency of a particular cell-metric mathematical function is substantially enhanced when the calculation of the cell-metric does not require alignment of the cell-sized window to an actual cell boundary to yield robust results. Avoiding or minimizing image or cell alignment is highly desirable in making the overall cell-metric computationally efficient and is preferable for cost-effective and commercially viable implementations of the invention. FIG. 8B is a graph showing the cell-metric-array or profile for the all array image. Horizontal axis 820 represents the location in the image in actual linear or arbitrary units and the vertical axis 830 represents the value of the cell-metric. Graph line 835 shows the value of the cell-metric at various points in the image 800. As the image 800 is a purely all cell array image, there is relatively little variation in the value of the cell-metric and it is clustered around the value "P", the cell-metric-reference, that is "P" is the median value (or other average) of the cell-metric for an all-array image or image region.

FIG. 7 step 740 comprises calculating a histogram of the cell-metric-array. FIG. 7 step 750 is comprised of selecting the peak of the cell-metric histogram which is the cell-metric-reference value "P". FIG. 8C is a graph of the cell-metric histogram. Horizontal axis 850 represents incremental values of the cell-metric and vertical axis 860 represents the relative number of points in the cell-metric-array that correspond to each particular value of the cell-metric. Graph line 865 shows the actual histogram distribution of the cell-metric-array. The values are relatively tightly clustered around the cell-metric-reference value "P". The actual value of "P" can be for example determined by finding the peak of the histogram. The cell-metric-reference, "P", is used during inspection to segment cell-metric histograms to differentiate areas representing repetitive and non-repetitive regions (and their boundaries) of the inspection image data.

Selection of a robust cell-metric mathematical function is essential for reliable results and low error rates. Ideally, a good cell-metric will have a distinct value when measured over a repetitive array area, and a different value or values over any other area or structure.

It is also preferable that the cell-metric is stable; that is the cell-metric has a consistent value across an image and across many images. Primary reasons for cell-metric instability include background illumination and contrast variations within one image and between images. Such variations occur to some degree on most inspection systems but are a particular challenge on e-beam inspection images where subtle variations in leakage current across a wafer result in background and contrast differences. These image variations present a difficulty to the algorithm, since often the calculation of a cell-metric-reference occurs on one image or area of a wafer and then is used to interpret cell-metric values for subsequent images as described above.

Note that the cell-metric does not have to be one-dimensional. Multiple one-dimensional cell-metrics can be measured separately or in parallel and combined in a linear combination or used as a vector. This approach adds robustness to the process, but increases complexity and execution time. Calculating multidimensional thresholds also adds to the computation time but are well known to those of skill in the art. A number of possible choices for the cell-metrics are listed below.

No matter how good the chosen cell-metric, it will occasionally result in small errors or "holes" both in the non-repetitive and repetitive regions. A subsequent step comprising morphological operations is necessary to cleanup the resulting segmented image (or profile) to create reliable data and a clean mask. These morphological operations can use the knowledge that almost all of these errors are smaller than a single cell in order to remove features of the thresholded cell-metric that are smaller than one cell (without significantly degrading the defect capture rate or false defect or false alarm rate). Introducing some other known information to this step is also helpful in getting better, cleaner results. Such information may include the approximate minimum width of the expected regions in the inspection images.

A list of cell-metrics follows: Cell-metrics can be comprised of one or more image statistical measures including the mean, median, variance, standard deviation, higher order statistical measures of the image such as for example entropy (entropy is well known to those of skill in the art and is described in text books such as "Fundamentals of Digital Image Processing" by Anil K. Jain, published by Prentice Hall in 1989) and the sum of absolute or square differences. The mean and sum of absolute differences for example are quite sensitive to background illumination variations but work well when background illumination variations are not present, or are removed or are filtered prior to the cell-metric calculation. In general these statistically-based cell-metrics work well for images with Gaussian probability density function (PDF) distributions, however, not all repetitive array regions will result in Gaussian probability density function distributions.

The normalized range of the image is a good, robust cell-metric that is relatively insensitive to background and contrast variations and that is computationally efficient. The range can be calculated as the difference between the maximum and minimum values of a cell-sized portion of an image and normalized by dividing this difference by the sum of the maximum and minimum (e.g. Range=(max−min)/(max+min)) over the cell-sized portion. The range is in effect a measure of local histogram spread and is relatively independent of the type of local image distribution (or the local PDF). More importantly, the range has proven to be stable across a wide range of images and microfabricated structures.

Template matching with a cell template extracted from the first array image can also be effective as a cell-metric. Template matching, however, produces noisy results on some image types. It is also computationally relatively expensive unless dedicated hardware is used for the calculation.

Fourier analysis or fast-Fourier transformation can also for the basis of a good cell-metric but tend to be relatively computationally intensive.

Combinations can Cell-metrics can also be combined to increase robustness. For example, combining the range and the mean either linearly or as a vector or combining the range and standard deviation again either linearly or as a vector.

Those of skill in the art will recognize that this list of cell-metrics and cell-metric combinations is not exhaustive and that other cell-metrics or combinations of metrics can be employed without departing from the scope of the invention.

FIG. 9A illustrates schematically 900 the dual one-dimensional profile (dual profile) approach to sampling the image with the cell-metric. Based on the assumption that all non-repetitive regions span across an image (a reasonable assumption for real-world wafers) the dual profile approach ensures reliable detection of all those non-repetitive regions and is computationally efficient.

Image 910 acquired during inspection is comprised of non-repetitive regions 920 and 924, and repetitive regions 930 and 934. This is a relatively complicated example image to analyze as there are two repetitive and two non-repetitive regions present. Note that the non-repetitive regions 920 and 924 span the complete image. Image 910 is sampled with four one-dimensional cell-metric array profiles lines, 950, and 960 in the X direction and, 970 and 980 in the Y direction. Note these profiles are chosen for reasons of simplicity and ease of computation and do not necessarily need to be parallel nor orthogonal with respect to one another or the cell layout or repeat directions. Two profiles are used in each direction to ensure that all repetitive and non-repetitive regions are reliably detected and that sufficient information is generated in order to create an accurate mask.

Cell-sized sliding window 952 is moved incrementally along line 950. The increment size can be varied typically from one pixel to approximately one cell size. Best results are achieved with an increment of approximately less than half the cell size. Graph 952 is the one-dimensional line profile of the thresholded cell-metric acquired from line 950. Horizontal axis 953 represents the relative position of sliding window 952 in pixels, microns or other length units. Vertical axis 954 is the relative value of the thresholded cell-metric. Thresholded cell-metric value of "1" represents regions of the one-dimensional profile line 950 and therefore the corresponding location in the image, that are repetitive and cell-metric value "0" represents regions of the profile where the image is non-repetitive.

Similarly graph 962 corresponds to line 960, graph 972 illustrates the thresholded cell-metric profile for line 970 and graph 982 illustrates the thresholded cell-metric profile for line 980. Horizontal axes 963, 973 and 983 represent the relative position of sliding windows (not shown) on lines 960, 970, 980 respectively, in pixels, microns or other units.

Vertical axes 964, 974 and 984 represent the relative value of respectively thresholded cell-metric. Thresholded cell-metric value of "1" represents regions of the one-dimensional profile line profiles 960, 970 and 980 corresponding to locations in the image that are repetitive and cell-metric value "0" represents regions of the profile where the image is non-repetitive. Graph lines 965, 975 and 985 show the value of the thresolded cell-metric as a function of position along the respective lines 960, 970 and 980. Graph line segments 968, 979 and 989 correspond to regions of image 910 that are repetitive. Graph line segments 969, 978 and 988 correspond to regions of image 910 that are non-repetitive.

Figure 9B:
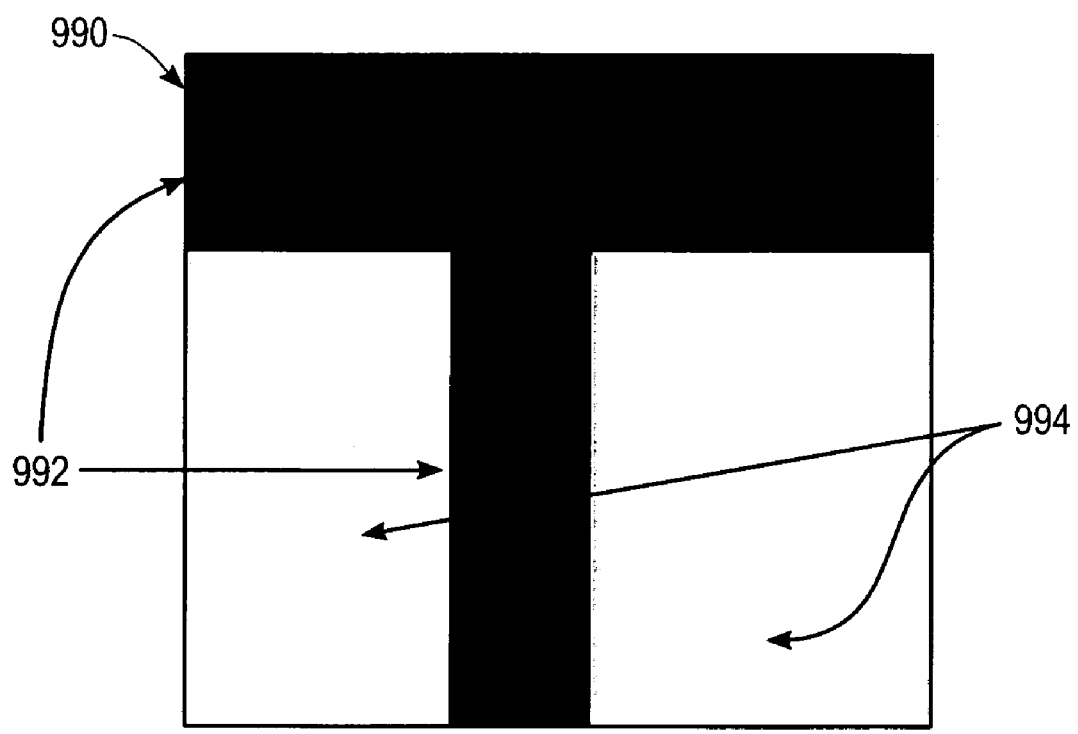
FIG. 9B is a diagram illustrating the creation of a non-repetitive area mask during the dual profile approach in accordance with a preferred embodiment of the present invention.

Graph lines 959, 965, 975, 985 are combined (with knowledge that non-repetitive regions span at least a complete image) to form example non-repetitive region mask 990 illustrated in FIG. 9B. The dark region 992 of the mask 990 correspond to regions of the image that are non-repetitive and light regions 994 correspond to regions of the image that are accurately repetitive and that can be inspected with array type inspection algorithms such as shift and subtract.

Figure 10:
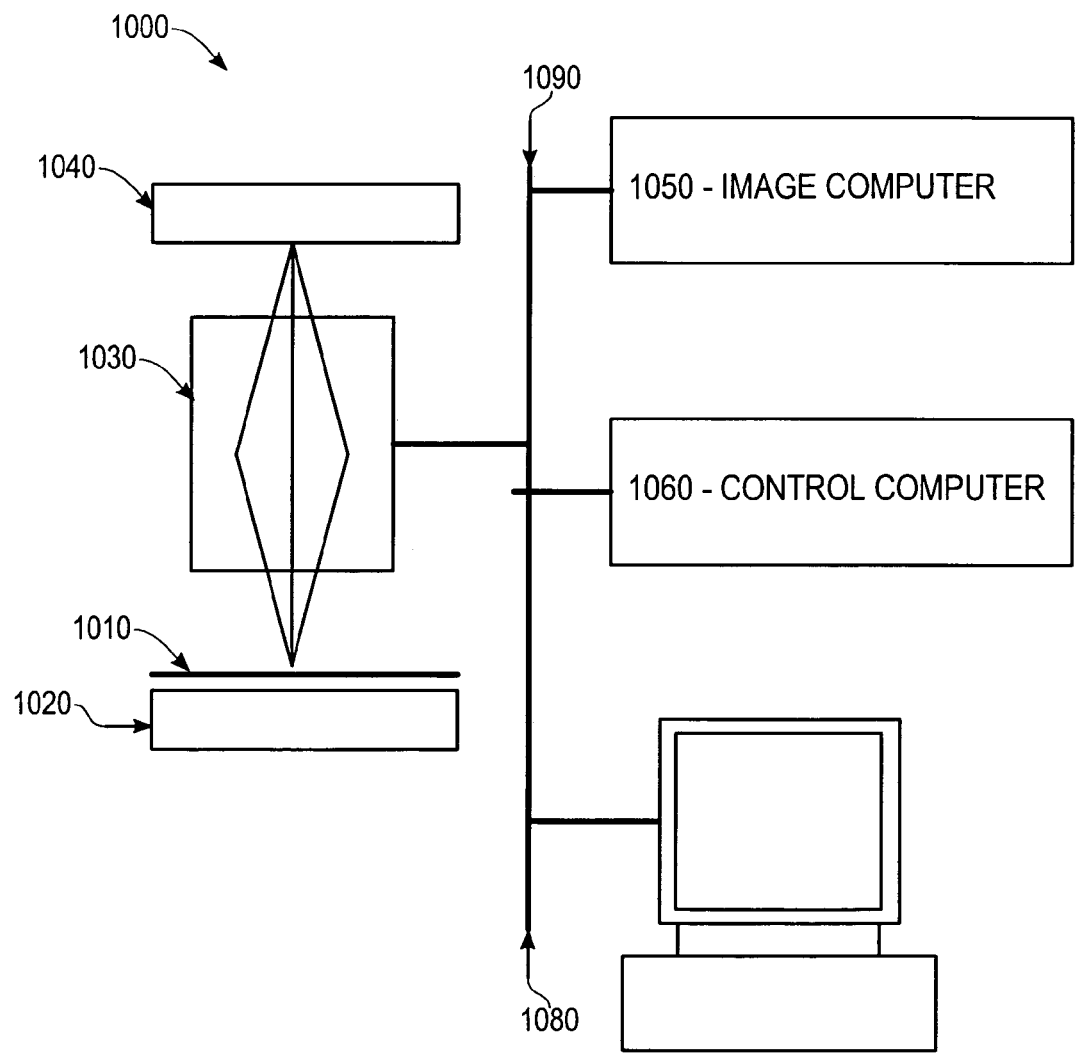
FIG. 10 is a schematic of a system block diagram according to a preferred embodiment of the invention.

FIG. 10 is a system block diagram of a system apparatus 1000 in accordance with a preferred embodiment of the invention. Microfabricated structures or wafer 1010 (wafer) are placed on a stage 1020. In the case of a semiconductor wafer, such system apparatus would typically be equipped with automatic robot wafer handling (not shown) and a wafer chuck (not shown) capable of accommodating the maximum wafer size to be inspected—typically up to 300 mm at the time of filing. Best results are often achieved with an electrostatic chuck that holds the wafer in place with an electrostatic dipole field. The force resulting from this field tends to flatten wafers (that are often warped into a potato chip-like shape during semiconductor processing) thus reducing the requirements for automatic focusing and for depth of focus of microscope 1030.

Stage 1020 will typically have at least one continuous motion axis to facilitate inspection without the overhead of starting and stopping the stage 1020 motion for each image or wafer region.

Wafer 1010 is imaged with microscope 1030. Microscope 1030 can be an optical microscope capable of bright field, dark field and other imaging modes to detect defects. Also microscope 1030 can preferably be an electron microscope, SEM (Scanning Electron Microscope) or electron projection microscope (such as described in U.S. Pat. No. 5,973,323 to Adler et al. "Apparatus and method for secondary electron emission microscope") capable of one or more imaging modes including voltage contrast, topographic or surface imaging, materials contrast imaging. When microscope 1030 is an electron microscope, it will preferably be equipped with a bright electron source such as a thermal field emission or cold field emission source for highspeed, low-noise imaging. Microscope 1030 can also be a scanning ion beam microscope capable of one or more imaging modes including but not limited to secondary electron, secondary ion and light emission from neutral atoms ejected during imaging.

Microscope 1030 is equipped with a detector and video digitizer subsystem 1040 that captures the microscope imaging signal and converts it preferably to a digitized signal for transfer preferably at high speed to image computer 1050. In the case of microscope 1030 being light optical in nature, subsystem 1040 can be comprised of a Time Delay Integration Charge Coupled Device image sensor (coupled to Analog-to-Digital Converter electronics) with scan synchronized to the scanning motion of stage 1020. When Microscope 1030 is a charged particle beam microscope (electron or ion), subsystem 1040 can be comprised of a high speed solid-state charged particle detector and highspeed analog-to-digital converter.

Video signal line 1090 transfers digitized video data from subsystem 1040 to image computer 1050. Image computer 1050 performs inspection algorithms and method as described on the video signal and reports the defect location information to control computer 1060 via system bus 1080. Defect data can then optionally be displayed on display means 1070, which is preferably a high performance PC equipped with an easy-to-use graphical user interface. Control computer 1060 controls the operation of the whole system via system bus 1080 and is preferably equipped with a real-time operating system such as VXWorks by Wind River Systems of San Jose, Calif.

Image computer 1050 and control computer 1060 are equipped with stored programs in computer readable format that implement the acquiring 220, analyzing 230 and comparing 240 steps as depicted in FIG. 2 to find defects particularly in repetitive microfabricated structures.

Figure 11:
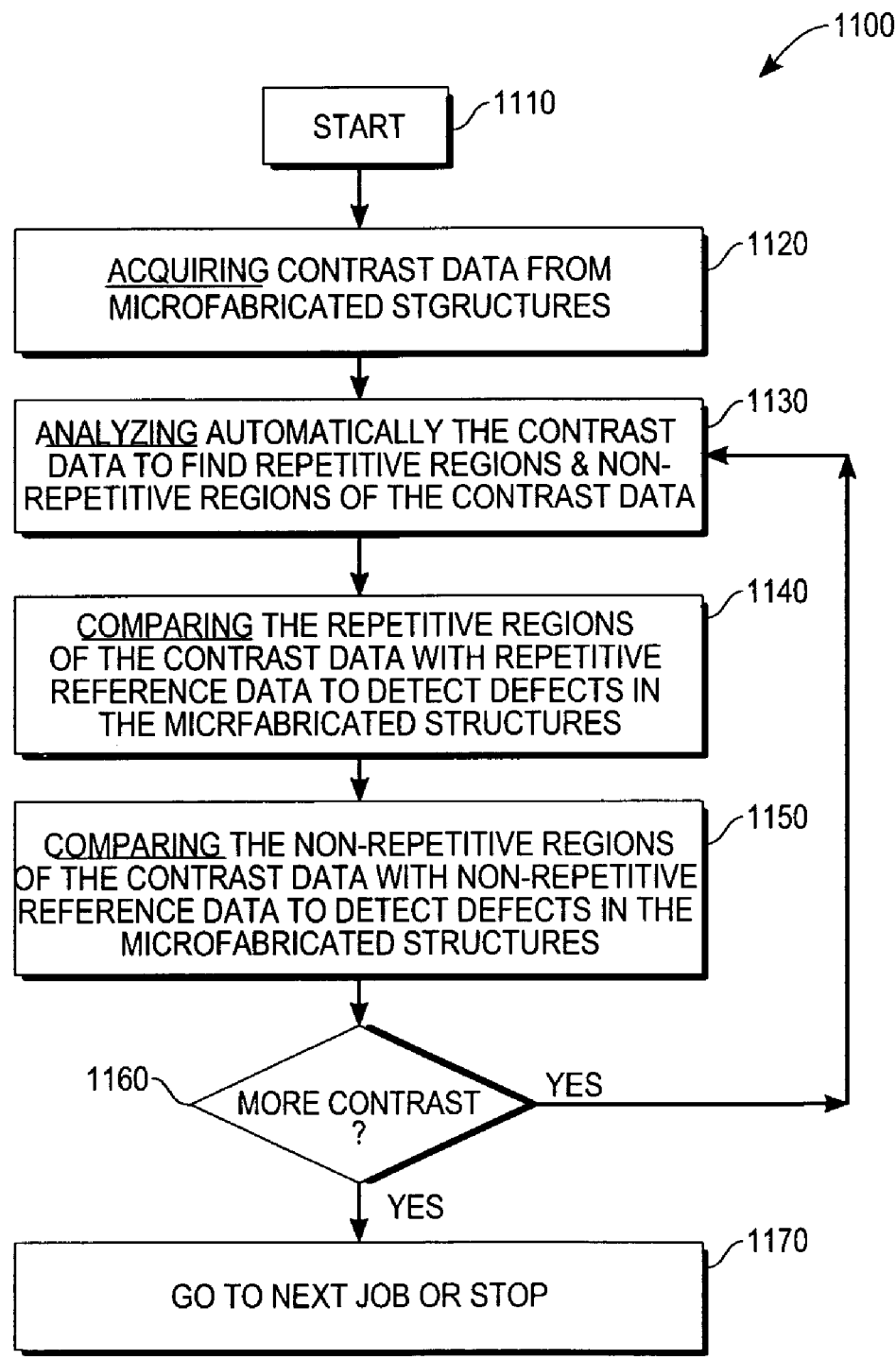
FIG. 11 is a flow diagram for inspecting both repetitive and non-repetitive areas of a microfabricated structure during a single pass inspection in accordance with a preferred embodiment of the present invention.

FIG. 11 is a flow diagram 1100 of a method according to the present invention of inspecting in a single pass of the wafer both the non-repetitive regions of the wafer with algorithms optimized for non-repetitive regions and the repetitive regions of the wafer with algorithms optimized for repetitive regions. Most commercially available inspection systems today, both optical and electron-based, support inspection of either repetitive or non-repetitive regions, but not both together in a single pass. The requirement for two passes of the wafer to cover optimally both array (repetitive) and random (non-repetitive) regions has a substantial throughput and cost burden for the users. The capability of the present invention to reliably and automatically detect repetitive regions and non-repetitive regions and accurately to delineate the boundaries between the two provides the means for systematically segmenting the image data acquired during inspection and facilitating automatic use of either repetitive or non-repetitive (array or random) algorithms as appropriate on the segmented image or data.

Flow diagram 1100 starts at step 1110 which is comprised of preparation for the inspection process including loading and aligning the microfabricated structures or wafer for inspection, writing an inspection recipe or loading a pre-stored inspection recipe which controls the inspection parameters during inspection.

Step 1120 is comprised of acquiring contrast data or image data from the microfabricated structures. Step 1130 is comprised of analyzing automatically the contrast or image data to find the repetitive and non-repetitive regions of the data and in particular to find the boundaries between these regions. Preferably both the location and boundaries between repetitive and non-repetitive regions are found. For example the methods of analyzing images described in FIGS. 5–8 or FIGS. 9A–B can be used to determine the location and boundaries of repetitive and non-repetitive regions of the data. It should be noted that although the description given in FIGS. 5–9 is presented in terms of location particularly of repetitive regions, the non-repetitive region information is the reverse or complement of the repetitive regions. Those of skill in the art will recognize that other methods can also be employed to determine the location and boundaries between these regions without departing from the scope of the invention.

Step 1140 is comprised of comparing the repetitive regions of the contrast data with repetitive reference data (as for example in the step-and-shift algorithm) to detect defects in the microfabricated structures. Other inspection algorithms tailored to repetitive structures can also be used at this step. Step 1140 can also optionally include explicitly or implicitly generating a mask to mask-out non-repetitive regions during inspection or this step may be implicit in the particular algorithm's use of the location and boundary information generating during step 1130.

Step 1150 is comprised of comparing the non-repetitive regions of the contrast data with non-repetitive reference data to detect defects in the microfabricated structures. Optionally, step 1150 can include storing the contrast data for future use as a reference. Also if no reference is available initially, for example, at the start of the inspection run, step 1150 can be comprised simply of storing the contrast data for future use as a reference with no defects being reported or comparison taking place.

Any inspection algorithms tailored to non-repetitive structures can be used at this step. Masking to mask out repetitive regions is optional at this step. The non-repetitive inspection algorithm can be used to inspect all contrast data both repetitive and non-repetitive or the inverse of any mask generated during inspection of the repetitive regions (step 1140) may be employed or any location and boundary information generated at step 1130 can be used directly.

It should be noted that steps 1040 and 1050 can be performed in either order or indeed in parallel depending upon the internal architecture of the image processing hardware being employed.

After defects have been detected, the defect data is reported preferably visually on a computer display. Defect data can also be sent to a host computer or computers, to other analysis tools including defect review tools and SEMs with automatic defect classification software. Reporting defect data can include other communication means such as light towers or audible reporting.

Although the foregoing is provided for purposes of illustrating, explaining and describing certain embodiments of the automated repetitive array microstructure defect inspection invention in particular detail, modifications and adaptations to the described methods, systems and other embodiments will be apparent to those skilled in the art and may be made without departing from the scope or spirit of the invention.

The invention claimed is:

1. A method for detecting defects in microfabricated structures having repetitive and non-repetitive regions, the method comprising:
   a. acquiring contrast data from the microfabricated structures;
   b. finding repetitive regions of the microfabricated structures by creating at least one X-direction one-dimensional profile of a cell-metric of the contrast data and at least one Y-direction one-dimensional profile of the cell-metric of the contrast data and thresholding the at least one X-direction one-dimensional profile and the at least one Y-direction one-dimensional profile to derive contrast data of the repetitive regions; and
   c. comparing the contrast data of the repetitive regions with reference data concerning said repetitive regions to detect defects in the microfabricated structures.

2. The method of claim 1, wherein the repetitive regions comprise repetitive cells within the microfabricated structures.

3. The method of claim 1 further comprising finding non-repetitive regions of the microfabricated structures and comparing contrast data of the non-repetitive regions so found with reference data concerning said non-repetitive regions.

4. The method of claim 1, wherein finding repetitive regions includes creating at least two X-direction one-dimensional profiles of the cell-metric of the contrast data and at least two Y-direction one-dimensional profiles of the cell-metric of the contrast data and thresholding the two X-direction one-dimensional profiles and the two or more Y-direction one-dimensional profile to find the repetitive regions in the microfabricated structures.

5. The method of claim 1, wherein acquiring contrast data comprises acquiring the contrast data with an e-beam inspection system.

6. The method of claim 1 further comprising reporting defect data of detected defects.

7. The method of claim 1, wherein the microfabricated structures are on a semiconductor wafer.

8. The method of claim 1, wherein comparing comprises arbitration comparison of the contrast data with at least two reference data sets.

9. The method of claim 1, wherein the acquiring comprises acquiring the contrast data with an integer number of pixels across a single repeated cell of the microfabricated structures.

10. A method for defect inspection of semiconductor wafers having repetitive and non-repetitive regions, the method comprising:
   a. acquiring contrast data from the semiconductor wafer with an e-beam defect inspection system;

b. finding the repetitive regions of the semiconductor wafers by creating at least one X-direction one-dimensional profile of a cell-metric of the contrast data and at least one Y-direction one-dimensional profile of the cell-metric of the contrast data and thresholding the at least one X-direction one-dimensional profile and the at least one Y-direction one-dimensional profile to derive contrast data of the repetitive regions;

c. comparing the contrast data of the repetitive regions with reference data concerning the repetitive regions to find locations of defects in the semiconductor wafer; and d. reporting the locations of the defects.

11. A defect inspection system for detecting defects in microfabricated structures having repetitive and non-repetitive regions, the system comprising:

an XY stage disposed to support the microfabricated structures for inspection;

a microscope and detector oriented with respect to the XY stage so as to acquire contrast data of the microfabricated structures supported thereby;

an image computer equipped with stored program instructions for processing the contrast data to find repetitive regions of the microfabricated structures by creating at least one X-direction one-dimensional profile of a cell-metric of the contrast data and at least one Y-direction one-dimensional profile of the cell-metric of the contrast data and thresholding the at least one X-direction one-dimensional profile and the at least one Y-direction one-dimensional profile, and comparing those portions of the contrast data obtained from the repetitive regions with reference data concerning said repetitive regions to detect defects in the microfabricated structures.

12. The defect inspection system of claim 11 wherein the microscope is an e-beam-based microscope.

13. The defect inspection system of claim 11 wherein the repetitive regions comprise repetitive cells of the microfabricated structures.

14. The defect inspection system of claim 11 wherein the microscope is an optical microscope.

15. The defect inspection system of claim 11 wherein the microfabricated structures are on a semiconductor wafer.

16. The defect inspection system of claim 11 wherein a magnification of the microscope is set to ensure an integer number of pixels of the contrast data across a single repeated cell of the microfabricated structures.

17. The defect inspection system of claim 11 wherein the instructions for processing further comprise finding non-repetitive regions of the micro fabricated structures and comparing contrast data of the non-repetitive regions with reference data concerning the non-repetitive regions to detect further defects in the microfabricated structures.

18. The defect inspection system of claim 11 wherein the instructions for processing further comprise reporting detected defects.

19. A defect inspection system for detecting defects in microfabricated structures having repetitive and non-repetitive regions, the system comprising:

XY stage means disposed to support the microfabricated structures for inspection;

microscope means and detector means oriented with respect to the XY stage means so as to acquire contrast data of the microfabricated structures supported thereby;

means for processing the contrast data to find repetitive regions of the microfabricated structures by creating at least one X-direction one-dimensional profile of a cell-metric of the contrast data and at least one Y-direction one-dimensional profile of the cell-metric of the contrast data and thresholding the at least one X-direction one-dimensional profile and the at least one Y-direction one-dimensional profile, and for comparing those portions of the contrast data from the repetitive regions with reference data concerning the repetitive regions to the detect defects in the microfabricated structures.

20. The defect inspection system of claim 19 wherein the microscope means is an e-beam-based microscope.

21. The defect inspection system of claim 19 wherein the repetitive regions comprise repetitive cells of the microfabricated structures.

22. The defect inspection system of claim 19 wherein the microscope means is an optical microscope.

23. The defect inspection system of claim 19 wherein the microfabricated structures are on a semiconductor wafer.

24. The defect inspection system of claim 19 wherein a magnification of the microscope means is set to ensure an integer number of pixels of the contrast data across a single repeated cell of the microfabricated structures.

25. The defect inspection system of claim 19 wherein the means for processing are configured for finding non-repetitive regions of the microfabricated structures and comparing contrast data of the non-repetitive regions with reference data concerning the non-repetitive regions to detect further defects in the microfabricated structures.

26. The defect inspection system of claim 19 wherein the means for processing are configured to report detected defects.

* * * * *